(12) United States Patent
Feng et al.

(10) Patent No.: US 12,453,722 B2
(45) Date of Patent: Oct. 28, 2025

(54) MALEATE OF NICOTINYL ALCOHOL ETHER DERIVATIVE, CRYSTAL FORM THEREOF, AND APPLICATION THEREOF

(71) Applicant: INSTITUTE OF MATERIA MEDICA, CHINESE ACADEMY OF MEDICAL SCIENCES, Beijing (CN)

(72) Inventors: Zhiqiang Feng, Beijing (CN); Xiaoguang Chen, Beijing (CN); Chen Ma, Beijing (CN); Yang Yang, Beijing (CN); Fangfang Lai, Beijing (CN); Yuchen Wang, Beijing (CN); Ming Ji, Beijing (CN); Kaijing Guo, Beijing (CN)

(73) Assignee: Institute of Materia Medica, Chinese Academy of Medical Sciences, Beijing (CN)

( * ) Notice: Subject to any disclaimer, the term of this patent is extended or adjusted under 35 U.S.C. 154(b) by 904 days.

(21) Appl. No.: 17/641,265

(22) PCT Filed: Sep. 9, 2020

(86) PCT No.: PCT/CN2020/114137
§ 371 (c)(1),
(2) Date: Aug. 4, 2022

(87) PCT Pub. No.: WO2021/047528
PCT Pub. Date: Mar. 18, 2021

(65) Prior Publication Data
US 2025/0268874 A1    Aug. 28, 2025

(30) Foreign Application Priority Data
Sep. 9, 2019    (CN) .......................... 201910864721.X

(51) Int. Cl.
*A61K 31/4406* (2006.01)
*A61P 35/00* (2006.01)
*C07D 213/30* (2006.01)

(52) U.S. Cl.
CPC .......... *A61K 31/4406* (2013.01); *A61P 35/00* (2018.01); *C07D 213/30* (2013.01)

(58) Field of Classification Search
CPC .... A61K 31/4406; A61P 35/00; C07D 213/30
See application file for complete search history.

(56) References Cited

U.S. PATENT DOCUMENTS

2020/0055819 A1    2/2020    Feng et al.

FOREIGN PATENT DOCUMENTS

| CN | 103787902 A | 5/2014 |
| CN | 109153670 A | 1/2019 |
| CN | 111925318 B | 2/2023 |
| EP | 3466944 A1 | 10/2010 |
| WO | 2013/126428 A1 | 8/2013 |
| WO | 2015/160641 | 10/2015 |

OTHER PUBLICATIONS

PCT International Search Report for PCT Application No. PCT/CN2020/114137 mailed Nov. 13, 2020 (7 page, with English translation).
PCT Written Opinion for PCT Application No. PCT/CN2020/114137 mailed Nov. 13, 2020 (10 pages, with English translation).
Richard J. Bastin, et al., "Salt Selection and Optimisation Procedures for Pharmaceutical New Chemical Entities", Organic Process Research Development, 2000, 4:427-435.
Mino R. Caira, "Crystalline Polymorphism of Organic Compounds", Topics in Current Chemistry, 1998, 198:163-208.
Sherry L. Morissette, et al., "High-throughput crystallization:polymorphs, salts, co-crystals and solvates of pharmaceutical solids", Advanced Drug Delivery Reviews, 2004, 56:275-300.
Narayan Variankaval, et al., "From Form to Function: Crystallization of Active Pharmaceutical Ingredients", AIChE Journal, Jul. 2009, 54:7, pp. 1682-1688.

(Continued)

*Primary Examiner* — Joseph K McKane
*Assistant Examiner* — Quincy McKoy
(74) *Attorney, Agent, or Firm* — Merchant & Gould P.C.

(57) ABSTRACT

The present invention relates to the technical field of medicine, and disclosed a maleate of a nicotinyl alcohol ether derivative, a crystal form thereof, and an application thereof, i.e., (S)-N-(2-(pyridin-3-yl-methoxy)-4-(2-bromo-3-phenylbenzyloxy)-5-chlorobenzyl) serine isopropyl ester maleate and a stereoisomer and a crystal form thereof, a preparation method therefor, a pharmaceutical composition, and a use thereof. Specifically, the present invention relates to the (S)-N-(2-(pyridin-3-yl-methoxy)-4-(2-bromo-3-phenylbenzyloxy)-5-chlorobenzyl) serine isopropyl ester maleate represented by formula I, and a crystal form thereof, a stereoisomer thereof, a preparation method therefor, a composition containing said compound or the crystal form thereof, and a use of said compound or the crystal form thereof in the preparation of a medicine for treating diseases related to a PD-1/PD-L1 signaling pathway, such as cancer, infectious diseases and autoimmune diseases.

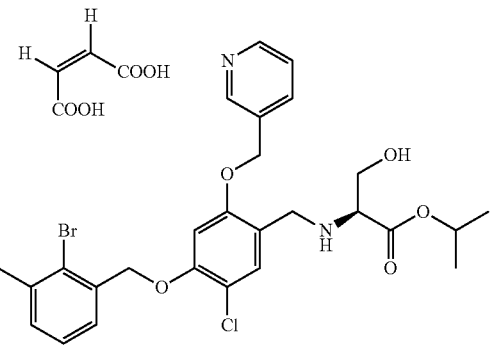

12 Claims, 2 Drawing Sheets

(56) References Cited

OTHER PUBLICATIONS

L.I. Mit'kina, et al., Stress Studies and Photostability as a Part of Pharmaceutical Drug Development Data, Scientific Centre for Expert Evaluation of Medicinal Products Bulletin, 2015, 2:9-12 (includes English Abstract).

MALEATE OF NICOTINYL ALCOHOL ETHER DERIVATIVE, CRYSTAL FORM THEREOF, AND APPLICATION THEREOF

CROSS-REFERENCE TO RELATED APPLICATIONS

This application is a National Stage Application of PCT/CN2020/114137, filed 9 Sep. 2020, which claims priority to Ser. No. 201910864721.X filed in China on 9 Sep. 2019, and which applications are incorporated herein by reference. To the extent appropriate, a claim of priority is made to the above disclosed applications.

FIELD OF THE INVENTION

The present invention belongs to the technical field of medicine and discloses a maleate of nicotinyl alcohol ether derivative, a crystal form thereof and use, that is, isopropyl (S)-N-(2-(pyridine-3-yl-methoxy)-4-(2-bromo-3-phenyl-benzyloxy)-5-chlorobenzyl) serinate maleate, a preparation method thereof, a crystal form thereof, a pharmaceutical composition and use. Specifically, the present invention relates to isopropyl (S)-N-(2-(pyridine-3-yl-methoxy)-4-(2-bromo-3-phenylbenzyloxy)-5-chlorobenzyl) serinate maleate as shown in formula I, a stereoisomer thereof, a preparation method thereof, a crystal form thereof, a composition comprising the compound or a crystal form thereof, and use of the compound in the manufacture of a medicament in treating or preventing diseases related to PD-1/PD-L1 signal pathway, such as cancer, infectious diseases, autoimmune diseases and so on.

BACKGROUND

With the in-depth study of tumor immunity, it is found that tumor microenvironment can protect tumor cells from being recognized and killed by the immune system. The immune escape of tumor cells plays a very important role in the occurrence and development of tumor. In 2013. Science magazine listed tumor immunotherapy as the first of the ten breakthroughs, once again making immunotherapy be the "focus" in the field of tumor therapy. The activation or inhibition of immune cells is regulated by positive and negative signals. Programmed death 1 (PD-1)/PD-1 ligand (PD-L1) is a negative immunomodulatory signal, which inhibits the immune activity of tumor specific CD8+ T cells and mediates immune escape.

The ability of tumor cells to escape from the immune system is realized by binding the PD-L1 produced on its surface to the PD-1 protein of T cells. The tumor microenvironment in the body will induce the infiltrated T cells to highly express PD-1 molecules, and the tumor cells will highly express PD-L1 and PD-L2 which are ligands of PD-1, resulting in the continuous activation of PD-1 pathway in the tumor microenvironment, and the function of T cells is inhibited and the tumor cannot be found, so that it cannot send the immune system the order of attacking the tumor and killing tumor cells. PD-1 antibody is an antibody protein against PD-1 or PD-L1, and it can inhibit the binding between PD-1 and PD-L1 and block the pathway, partially restore the function of T cells and enable these cells to continue killing tumor cells.

Recently, a series of surprising research results have confirmed that PD1/PD-L1 inhibitory antibody has strong antitumor activity against a variety of tumors, which is attractive. On Sep. 4, 2014, Keytruda® (Pembrolizumab) from Merck in America became the first FDA approved PD-1 monoclonal antibody for the treatment of patients with advanced or unresectable melanoma to which other drugs are ineffectual. At present. MSD is testing the potential of Keytruda in more than 30 different types of cancer, including various blood cancers, lung cancer, breast cancer, bladder cancer, stomach cancer, head and neck cancer. On Dec. 22, 2014, Bristol Myers Squib, a pharmaceutical giant, lived up to its expectations and took the lead in obtaining accelerated approval from the U.S. Food and Drug Administration (FDA). Its anti-cancer immunotherapy drug nivolumab was listed under the trade name Opdivo for the treatment of patients with unresectable or metastatic melanoma which did not respond to other drugs, it is the second PD-1 inhibitor listed in the United States after Keytruda of MSD. On Mar. 4, 2015, the FDA approved nivolumab for the treatment of metastatic squamous non-small cell lung cancer with disease progression during or after platinum-based chemotherapy. According to the data of a phase Ib KEYNOTE-028 study of Keytruda (pembrolizumab) in the treatment of solid tumors published by MSD, treatment with Keytruda achieved 28% of the overall response rate (ORR) in 25 patients with pleural mesothelioma (PM), and 48% of the patients were in stable condition, and the disease control rate reached 76%. Patients with advanced Hodgkin's lymphoma (HL) which did not respond to any currently approved drugs can achieve complete remission after treatment with MSD's Keytruda and BMS's Opdvio. At the 2015AACR annual meeting. Leisha A. Emens, MD, PhD, an associate professor of oncology at John Hopkins Kimmel Cancer Center, reported that Roche's MPDL3280A, a monoclonal antibody with anti PD-L1 effect, showed a lasting therapeutic effect in advanced triple-negative breast cancer.

Although tumor immunotherapy is considered to be a revolution in cancer treatment after targeted therapy, mAb drug has its own defects: it is easy to be degraded by protease, so it is unstable in the body and cannot be taken orally: it is easy to produce immune cross reaction: the product quality is not easy to control, and the manufacturing technology requirements are high: mass preparation and purification are difficult and the production cost is high: it is inconvenient to use and it can only be injected or dripped. Therefore. PD1/PD-L1 interaction small molecule inhibitor is a better choice for tumor immunotherapy.

In the international application PCT/CN2017/085418, the inventors disclosed isopropyl (S)-N-[2-(pyridinyl-3-methoxy)-4-(2-bromo-3-(phenyl)benzyloxy)-5-chlorobenzyl] serinate hydrochloride and its use in the manufacture of a medicament in preventing or treating diseases related to PD-1/PD-L1 signal pathway, such as cancer, infectious diseases, autoimmune diseases, and so on. In later research, the inventors found that the maleate of the compound was stronger in stability and efficacy compared with its hydrochloride. The hydrochloride of the Example 1 of the present invention is prepared in full accordance with the preparation method in the international patent application PCT/CN2017/085418, as a comparative example.

Contents of the Invention

The technical problem solved by the present invention is to provide an isopropyl (S)-N-(2-(pyridine-3-yl-methoxy)-4-(2-bromo-3-phenylbenzyloxy)-5-chlorobenzyl) serinate maleate with the structural formula (I) which inhibits the interaction of PD-1/PD-L1, and a stereoisomer thereof, and a preparation method thereof, a pharmaceutical composition thereof, and its use in the manufacture of a medicament in preventing or treating diseases related to PD-1/PD-L1 signal pathway.

In Order to Solve the Technical Problem of the Present Invention, the Present Invention Provides The Following Technical Solution:

The first aspect of the technical solution of the present invention is to provide an isopropyl (S)-N-(2-(pyridine-3-yl-methoxy)-4-(2-bromo-3-phenylbenzyloxy)-5-chlorobenzyl) serinate maleate as shown in formula (I), and a stereoisomer thereof,

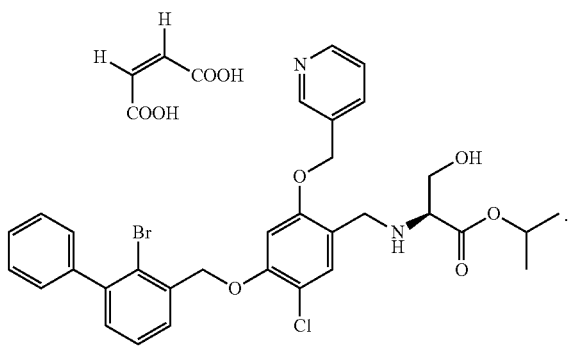

I

The second aspect of the technical solution of the present invention provides a crystal form A solid substance of isopropyl (S)-N-(2-(pyridine-3-yl-methoxy)-4-(2-bromo-3-phenylbenzyloxy)-5-chlorobenzyl) serinate maleate, wherein, when powder X-ray diffraction analysis is used and Cu Target Radiation experimental conditions are adopted, the position of diffraction peak: 2-theta value (°) or d value (Å) and relative intensity (%) of diffraction peak have the following characteristics:

| Peak | 2-Theta ±0.2° | d(Å) ±0.2 Å | intensity % ±5% |
|---|---|---|---|
| 1 | 4.5 | 19.6 | 42.3 |
| 2 | 5.6 | 15.9 | 50.1 |
| 3 | 6.8 | 13.0 | 14.0 |
| 4 | 8.5 | 10.4 | 16.2 |
| 5 | 9.1 | 9.8 | 100 |
| 6 | 10.2 | 8.7 | 28.1 |
| 7 | 12.4 | 7.1 | 11.1 |
| 8 | 13.3 | 6.7 | 18.6 |
| 9 | 13.6 | 6.5 | 35.6 |
| 10 | 14.6 | 6.1 | 12.1 |
| 11 | 15.5 | 5.7 | 15 |
| 12 | 16.0 | 5.5 | 11 |
| 13 | 16.6 | 5.3 | 13.6 |
| 14 | 17.1 | 5.2 | 14.2 |
| 15 | 17.4 | 5.1 | 13.8 |
| 16 | 17.9 | 4.9 | 17.4 |
| 17 | 18.7 | 4.7 | 17.6 |
| 18 | 19.0 | 4.7 | 20.1 |
| 19 | 19.7 | 4.5 | 35.5 |
| 20 | 20.0 | 4.4 | 46.6 |
| 21 | 20.7 | 4.3 | 58.3 |
| 22 | 21.6 | 4.1 | 35.5 |
| 23 | 22.2 | 4.0 | 15 |
| 24 | 22.7 | 3.9 | 33.6 |
| 25 | 23.1 | 3.9 | 50.5 |
| 26 | 23.9 | 3.7 | 42 |
| 27 | 25.0 | 3.6 | 16.4 |
| 28 | 25.4 | 3.5 | 19.2 |
| 29 | 26.6 | 3.4 | 28 |
| 30 | 28.0 | 3.2 | 13.9 |
| 31 | 28.4 | 3.1 | 15.9 |
| 32 | 29.3 | 3.1 | 19.1 |
| 33 | 29.9 | 3.0 | 14.2 |
| 34 | 30.4 | 2.9 | 14.4 |
| 35 | 31.0 | 2.9 | 15.7 |
| 36 | 31.6 | 2.8 | 15.6 |
| 37 | 32.7 | 2.7 | 12.2 |
| 38 | 34.0 | 2.6 | 12.7 |
| 39 | 34.9 | 2.6 | 11.9 |
| 40 | 35.7 | 2.5 | 13.4 |
| 41 | 39.0 | 2.3 | 11.2 |

The crystal form A solid material as described above, wherein, when analyzed by infrared spectrum, the absorption peaks at 3059, 2984, 2841, 2761, 2519, 2170, 1988, 1968, 1807, 1741, 1716, 1623, 1602, 1580, 1505, 1481, 1460, 1446, 1425, 1401, 1389, 1368, 1309, 1262, 1242, 1205, 1171, 1111, 1095, 1069, 1040, 1004, 972, 953, 924, 884, 870, 864, 854, 824, 788, 761, 721, 703, 662 cm$^{-1}$±2 cm$^{-1}$ are the characteristic peak positions of infrared spectrum presented by the crystal form A solid substance.

The crystal form A solid substance as described above, wherein, when analyzed by differential scanning calorimetry, there is an endothermic peak at 175° C.±3° C., in the DSC spectrum with a heating rate of 10° C., per minute.

The second aspect of the technical solution of the present invention also provides a mixed crystal solid substance of isopropyl (S)-N-(2-(pyridine-3-yl-methoxy)-4-(2-bromo-3-phenylbenzyloxy)-5-chlorobenzyl) serinate maleate, wherein, it comprises any non-zero proportion of the crystal form A solid substance of isopropyl (S)-N-(2-(pyridine-3-yl-methoxy)-4-(2-bromo-3-phenylbenzyloxy)-5-chlorobenzyl) serinate maleate.

The third aspect of the technical solution of the present invention provides a preparation method of the compound in the first aspect and the crystal form A solid substance in the second aspect:

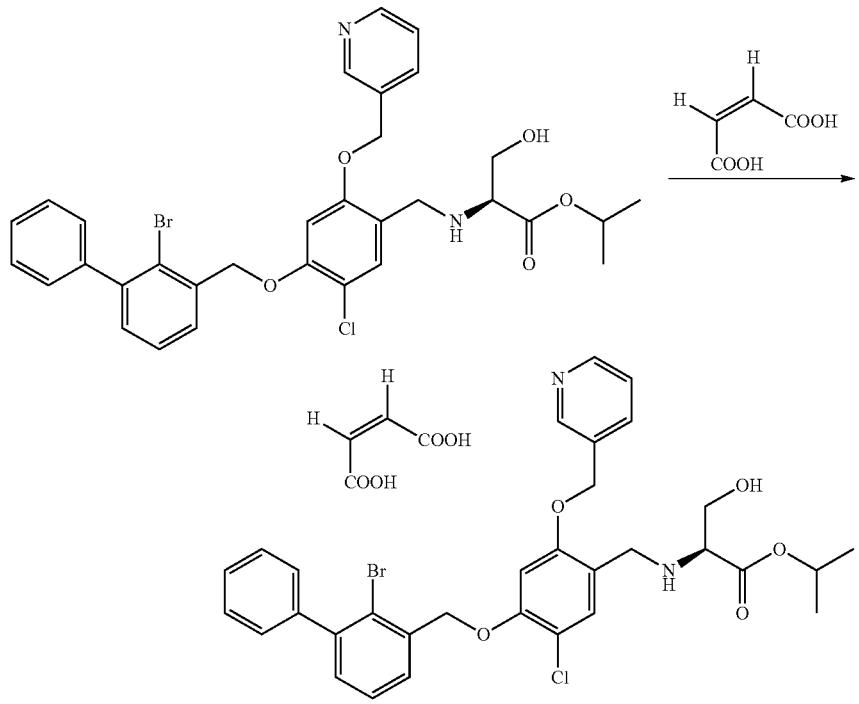

The preparation method of the compound of formula (I) is:
  reacting isopropyl (S)-N-(2-(pyridine-3-yl-methoxy)-4-(2-bromo-3-phenylbenzyloxy)-5-chlorobenzyl) serinate with maleic acid to form a salt in a solvent, most preferably, the solvent is isopropyl alcohol, tetrahydrofuran, or acetone;
  crystallizing the obtained isopropyl (S)-N-(2-(pyridine-3-yl-methoxy)-4-(2-bromo-3-phenylbenzyloxy)-5-chlorobenzyl) serinate maleate in a mixed solvent of acetone and water, the ratio of acetone to water ranges from 200:1 to 1:1, preferably, the ratio ranges from 50:1 to 5:1, most preferably, the ratio ranges from 25:1 to 10:1. During the preparation process of the compound of formula (I) and its solvates and salts, polycrystals may appear under different crystallization conditions.

The fourth aspect of the technical solution of the present invention provides a pharmaceutical composition, the pharmaceutical composition comprises the isopropyl (S)-N-(2-(pyridine-3-yl-methoxy)-4-(2-bromo-3-phenylbenzyloxy)-5-chlorobenzyl) serinate maleate in the first aspect of the present invention and a stereoisomer thereof or the crystal form A solid substance in the second aspect as an active ingredient, and a pharmaceutically acceptable carrier or excipient.

The present invention further relates to a pharmaceutical composition comprising the compound of the present invention as an active ingredient. The pharmaceutical composition can be prepared by methods well known in the field. Any dosage forms suitable for human or animal use can be prepared by combining the compound of the present invention with one or more pharmaceutically acceptable solid or liquid excipients and/or adjuvants. The content of the compound of the present invention in the pharmaceutical composition thereof is usually from 0.1 to 95% by weight.

The compound of the present invention or the pharmaceutical composition comprising the same can be administered in a unit dosage form, the administration route can be enteral or parenteral, such as oral, intravenous injection, intramuscular injection, subcutaneous injection, nasal, oral mucosa, eye, lung and the respiratory tract, skin, vagina, rectum, etc.

The administration dosage form can be a liquid dosage form, a solid dosage form or a semi-solid dosage form. Liquid dosage forms may be solution (including true solution and colloidal solution), emulsion (including o/w type, w/o type and double emulsion), suspension, injection (including water injection, powder injection and infusion), eye drops agents, nasal drops, lotions, tinctures, etc.; solid dosage forms may be tablets (including ordinary tablets, enteric tablets, lozenges, dispersible tablets, chewable tablets, effervescent tablets, orally disintegrating tablets), capsules (including hard capsules, soft capsules, enteric capsules), granules, powders, pellets, dropping pills, suppositories, films, patches, gas (powder) sprays, sprays, etc.; semi-solid dosage forms can be ointments, gel, paste, etc.

The compounds of the present invention can be formulated into common preparations, as well as sustained release preparations, controlled release preparations, targeted preparations, and various microparticle delivery systems.

In order to formulate the compound of the present invention into tablets, various excipients known in the field, including diluents, binders, wetting agents, disintegrating agents, lubricants, and glidants, can be used widely. The diluents may be starch, dextrin, sucrose, glucose, lactose, mannitol, sorbitol, xylitol, microcrystalline cellulose, calcium sulfate, calcium hydrogen phosphate, calcium carbonate, etc.; the wetting agents may be water, ethanol, or isopropanol, etc.; the binders may be starch syrup, dextrin, syrup, honey, glucose solution, microcrystalline cellulose, gum arabic, gelatin syrup, sodium carboxymethyl cellulose, methyl cellulose, hydroxypropyl methyl cellulose, ethyl cellulose, acrylic resin, carbomer, polyvinylpyrrolidone, polyethylene glycol, etc.; the disintegrating agents can be dry starch, microcrystalline cellulose, low-substituted hydroxypropyl cellulose, cross-linked poly vinyl pyrrolidone, croscarmellose sodium, sodium carboxymethyl starch, sodium hydrogencarbonate and citric acid, polyoxyethylene sorbitan fatty acid ester, sodium dodecyl sulfonate, etc.; the lubricants and glidants may be talc, silica, stearate, tartaric acid, liquid paraffin, polyethylene glycol, etc.

Tablets may also be further formulated into coated tablets such as sugar-coated tablets, film-coated tablets, enteric coated tablets, or bilayer tablets and multilayer tablets.

In order to formulate the administration unit into a capsule, the compound of the present invention as an active ingredient can be mixed with a diluent and a glidant, and then the mixture can be directly placed in a hard capsule or a soft capsule. The compound of the present invention as an active ingredient can also be formulated into a granule or a pellet with a diluent, a binder and a disintegrant, and then placed in a hard capsule or a soft capsule. Various diluents, binders, wetting agents, disintegrating agents or glidants for preparing the tablets of the compound of the present invention can also be used to prepare capsules of the compound of the present invention.

In order to formulate the compound of the present invention into an injection, water, ethanol, isopropanol, propylene glycol or their mixture may be used as a solvent, and an appropriate amount of a solubilizing agent, a co-solvent, a pH adjusting agent, and an osmotic pressure adjusting agent which are commonly used in the field can be added. The solubilizing agent or co-solvent may be poloxamer, lecithin, hydroxypropyl-β-cyclodextrin, etc.; the pH adjusting agent may be phosphate, acetate, hydrochloric acid, sodium hydroxide, etc.; the osmotic pressure adjusting agent may be sodium chloride, mannitol, glucose, phosphate, acetate, etc. For preparing a lyophilized powder injection, mannitol, glucose and so on may also be added as a proppant.

In addition, coloring agents, preservatives, perfumes, flavoring agents or other additives may also be added to the pharmaceutical preparations if needed.

In order to achieve the purpose of medication and enhance the therapeutic effect, the medicament or pharmaceutical composition of the present invention can be administered by any known administration method.

The administration dosage of the compound or pharmaceutical composition of the present invention can vary in a wide range depending on the nature and severity of the diseases to be prevented or treated, the individual condition of the patient or animal, the route of administration and the dosage form, etc. In general, a suitable daily dosage of the compound of the present invention ranges from 0.001 to 150 mg/kg body weight, preferably, ranges from 0.01 to 100 mg/kg body weight. The above dosages may be administered in one dosage unit or in divided dosage units depending on the clinical experience of the physician and the dosage regimen including the use of other therapeutic means.

The compound or composition of the present invention can be administered alone or in combination with other therapeutic or symptomatic agents. When the compound of the present invention synergizes with other therapeutic agents, its dosage should be adjusted according to the actual situation.

The fifth aspect of the technical solution of the present invention provides use of isopropyl (S)-N-(2-(pyridine-3-yl-methoxy)-4-(2-bromo-3-phenylbenzyloxy)-5-chlorobenzyl) serinate maleate and a stereoisomer thereof or the crystal form A solid substance in the second aspect in the manufacture of a medicament in preventing and/or treating diseases related to PD-1/PD-L1 signal pathway.

The diseases related to PD-1/PD-L1 signal pathway are selected from the group consisting of cancer, infectious diseases, and autoimmune diseases. The cancer is selected from the group consisting of skin cancer, lung cancer, urological tumor, blood tumor, breast cancer, glioma, digestive system tumor, reproductive system tumor, lymphoma, nervous system tumor, brain tumor, head and neck cancer. The infectious diseases are selected from the group consisting of bacterial infection and viral infection. The autoimmune diseases are selected from the group consisting of organ-specific autoimmune diseases, systemic autoimmune diseases, wherein, the organ-specific autoimmune diseases include chronic lymphocytic thyroiditis, hyperthyroidism, insulin-dependent diabetes mellitus, myasthenia gravis, ulcerative colitis, pernicious anemia with chronic atrophic gastritis, pulmonary hemorrhage nephritis syndrome, primary biliary cirrhosis, multiple sclerosis, acute idiopathic polyneuritis. And the systemic autoimmune diseases include rheumatoid arthritis, systemic lupus erythematosus, systemic vasculitis, scleroderma, pemphigus, dermatomyositis, mixed connective tissue disease, autoimmune hemolytic anemia.

Beneficial Technical Effects

Compared with isopropyl (S)-N-(2-(pyridine-3-yl-methoxy)-4-(2-bromo-3-phenylbenzyloxy)-5-chlorobenzyl) serinate hydrochloride, the compound isopropyl (S)-N-(2-(pyridine-3-yl-methoxy)-4-(2-bromo-3-phenylbenzyloxy)-5-chlorobenzyl) serinate maleate of the present invention has stable crystal form, good stability to light irradiation, high humidity and high temperature environment, and has high tumor inhibition rate for various types of tumors on the subcutaneous transplantation tumor model of mice or the NSG tumor-bearing mouse model reconstructed by human immune system.

SPECIFIC MODES FOR CARRYING OUT THE INVENTION

Figure 1:
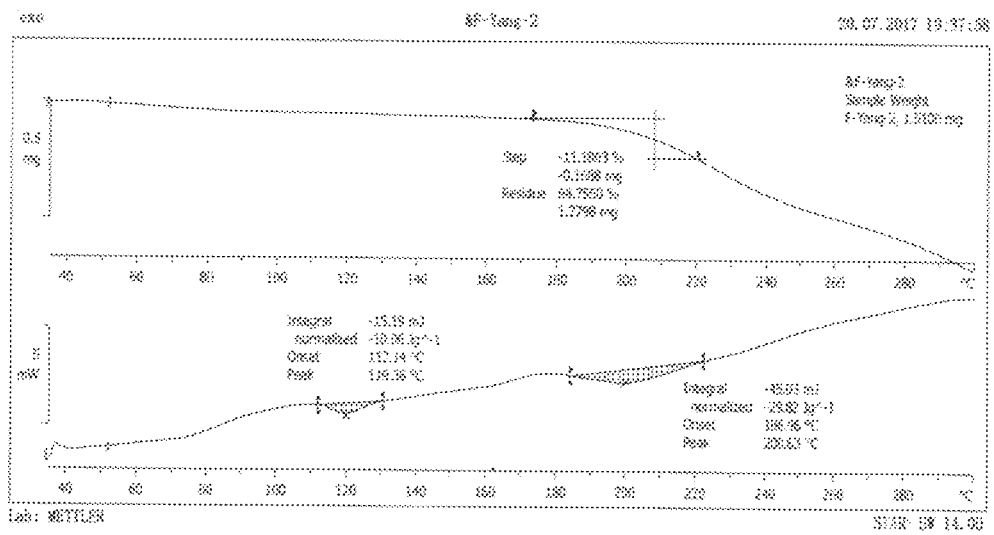
FIG. 1. Differential scanning calorimetry/thermogravimetric analysis spectrum of compound of Example 1.

The present invention will be further described below in combination with specific examples, but the scope of the present invention is not limited.

Test instruments: Bruker AVANCE III 500 high resolution superconducting nuclear magnetic resonance spectrometer is used for nuclear magnetic resonance spectroscopy. QSTAR Elite LC/MS/MS System is used for mass spectrometry. FLASH1112 trace element analyzer and MX-5 millionth Balance instrument are used for elemental analysis. Shimadzu UV-2700 UV-Vis spectrophotometer was used for UV analysis. American PE Model 343 polarimeter is used for specific rotation. D8-Advance X-ray diffractometer is used for powder X-ray diffraction analysis. Swiss Mettler TGA/DSC3[+] thermal analyzer is used for differential scanning calorimetry/thermogravimetric analysis (DSC/TG).

1. Preparation of Salt:
Example 1: isopropyl (S)-N-[2-(pyridine-3-yl-methoxy)-4-(2-bromo-3-(phenyl)benzyloxy)-5-chlorobenzyl] serinate hydrochloride (the Example is a comparative example, in which the compound is a known compound, and its preparation method is exactly the same as the Example 6 of the international application PCT/CN2017/085418)

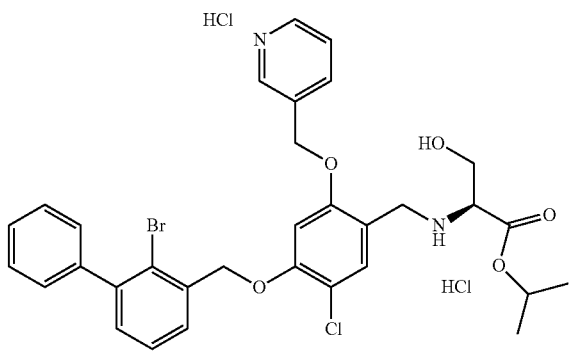 [SMILES: CC(C)OC(=O)[C@H](CO)NCc1cc(Cl)c(OCc2cccc(-c3ccccc3)c2Br)cc1OCc1cccnc1 ; Cl ; Cl]

598 mg of (S)-N-[2-(pyridine-3-yl-methoxy)-4-(2-bromo-3-(phenyl)benzyloxy)-5-chlorobenzyl] serine and 60 ml of anhydrous isopropanol were placed in a 100 ml round bottom flask. 6 ml of sulfoxide chloride and 2 drops of DMF were added under stirring in an ice water bath. The mixture was stirred at room temperature for 2 hours, heated and refluxed until the reaction was complete. The solvent was removed under reduced pressure to obtain isopropyl (S)-N-[2-(pyridine-3-yl-methoxy)-4-(2-bromo-3-(phenyl)benzyloxy)-5-chlorobenzyl] serinate hydrochloride, as a white solid. 1H NMR (400 MHZ, DMSO-$d_6$) δ 9.62 (s, 1H, —HCl), 9.40 (s, 1H, —HCl), 9.10 (s, 1H, —ArH), 8.86 (d, 1H, —ArH), 8.59 (d, J=7.6 Hz, 1H, —ArH), 8.01-7.91 (m, 1H, —ArH), 7.73-7.64 (m, 2H, —ArH), 7.57-7.46 (m, 3H, —ArH), 7.46-7.37 (m, 4H, —ArH), 7.16 (s, 1H, —ArH), 5.47 (s, 2H, —$CH_2$—), 5.36 (s, 2H, —$CH_2$—), 4.92 (m1H, —CH—), 4.30-4.15 (m, 2H, —$CH_2$—), 4.05 (s, 1H, —CH—), 3.97 (dd, J=12.0, 3.0 Hz, 1H, —$CH_2$—), 3.84 (dd, J=12.0, 3.8 Hz, 1H, —$CH_2$—), 1.20 (d, J=6.4 Hz, 3H, —$CH_3$), 1.18 (d, J=6.4 Hz, 3H, —$CH_3$), MS (FAB): 640 (M).

Example 2: isopropyl (S)-N-(2-(pyridine-3-yl-methoxy)-4-(2-bromo-3-phenylbenzyloxy)-5-chlorobenzyl) serinate maleate (IMMH-010)

At room temperature, isopropyl (S)-N-[2-(pyridine-3-yl-methoxy)-4-(2-bromo-3-(phenyl)benzyloxy)-5-chlorobenzyl] serinate (2.6 g) and isopropanol (9 ml) were added into a 50 ml reaction flask. The mixture was heated to 40° C., stirred for 0.5 h, and maleic acid (0.594 g) -isopropanol (4 ml) solution was added dropwise. The temperature was controlled at 35~45° C., and a solid was precipitated, then the mixture was stirred at the temperature for 0.5 h, naturally cooled down to room temperature, and stirred overnight. On the next day, the mixture was filtered by suction, and the filter cake was washed with 0.5 ml of isopropanol and 0.5 ml of acetone successively to obtain a light yellow solid, which is the crude product of isopropyl (S)-N-(2-(pyridine-3-yl-methoxy)-4-(2-bromo-3-phenylbenzyloxy)-5-chlorobenzyl) serinate maleate. At room temperature, the crude product and acetone (26 ml) were added into a 50 ml reaction flask, heated to reflux, and 1.4 ml of purified water was added dropwise. After being fully dissolved, the mixture was subjected to thermal filtration. After filtration, the filter cake was transferred to a 50 ml reaction flask, naturally cooled down to room temperature, and stirred for crystallization overnight. On the next day, the mixture was cooled down to 5~15° C., stirred for 2 h, and filtered by suction. The filter cake was washed with 0.5 ml of acetone, and subjected to forced air drying to constant weight at 45° C., to obtain a pure product (0.73 g), as a white solid.

2. Structural Confirmation of the Compound of Example 2:
1) Elemental Analysis:
   (1) Test instrument: trace element analyzer FLASH1112 and millionth balance MX-5.
   (2) Test method: carbon, hydrogen and nitrogen were measured twice in parallel.
   (3) Measured results:

| Elemental analysis data table of the compound of Example 2 | | | |
|---|---|---|---|
| Content (%) | C | H | N |
| Theoretical Value (%) | 57.19 | 4.80 | 3.71 |
| Measured value (%) | 57.10 | 4.80 | 3.63 |
|  | 57.21 | 4.78 | 3.59 |
| Average value (%) | 57.16 | 4.79 | 3.61 |
| Absolute error (%) | 0.03 | 0.01 | 0.1 |

2) High Resolution Mass Spectrometry:
   (1) Test instrument: QSTAR Elite LC/MS/MS System
   (2) Test condition: ESI source
   (3) Measured data:

| High resolution mass spectrometry data of the compound of Example 2 | |
|---|---|
| Measured value (m/z) of $[M + H]^+$ | 639.1259 |
| Theoretical value (m/z) of $[M + H]^+$ | 639.1256 |
| Error ($\times 10^{-6}$) | 0.49 |
| Molecular constitute of molecular ion peak | $C_{32}H_{33}N_2O_5ClBr$ |
| Molecular formula | $C_{32}H_{32}N_2O_5ClBr$ |

3) UV Absorption Spectrum:
   (1) Test instrument: Shimadzu UV-2700 UV-Vis spectrophotometer
   (2) Test method: the sample was prepared into a solution in a certain concentration, the same batch of solvent was used as the blank control, and 1 cm absorption cell was used to measure the absorption value in the range of 190~400 nm.
   Solvent: water—methanol (1:1), 0.1 mol/L of hydrochloric acid-methanol (1:1), 0.1 mol/L of sodium hydroxide—methanol (1:1)
   Test solution concentration: 20μ l/ml.
   (3) Measured data:

| UV data table of the compound of Example 2 | | | |
|---|---|---|---|
| IMMH-010 | $\lambda_{max}$ (nm) | Absorption value | Spectral band assignment |
| Methanol-water (1:1) | 206.50 | 2.567 | K-band absorption |
|  | 237.50 | 0.622 |  |
|  | 285.30 | 0.116 |  |
| 0.1 mol/L of hydrochloric acid-methanol (1:1) | 206.60 | 2.464 |  |
|  | 237.50 | 0.621 |  |
|  | 285.40 | 0.147 |  |
| 0.1 mol/L of sodium hydroxide-methanol (1:1) | 227.60 | 0.550 |  |
|  | 285.70 | 0.042 |  |

4) Infrared Absorption Spectrum:
   (1) Test instrument: British PE (Spectrum 400) infrared spectrometer (2) Test conditions: attenuated total reflection (ATR) infrared spectroscopy, powder direct injection

| IR data table of the compound of Example 2 | | | |
|---|---|---|---|
| absorption peak (cm$^{-1}$) | Vibration type | Group | Intensity |
| 3059 | =C—H stretching vibration | Aromatic ring, alkene | w |
| 2984, 2840 | C—H stretching vibration | Methyl, methylene | w |
| 1716 | C—O stretching vibration | Carboxyl (maleate) | w |
| 1741 | C=O stretching vibration | Ester bond | m |
| 1623 | C=C stretching vibration | Alkene bond (maleate) | m |
| 1600, 1580, 1505, 1446 | C=C stretching vibration | Aromatic ring | s |
| 1368, 1389, 1460 | C—H deformation vibration | Isopropyl | s |
| 703, 761, 788 | =C—H out of plane deviational vibration | Aromatic ring | s |

5) Nuclear Magnetic Resonance Hydrogen Spectrum and Carbon Spectrum:
  (1) Test instrument: Bruker AVANCE III 500 high resolution superconducting nuclear magnetic resonance spectrometer
  (2) Test conditions: the solvent was DMSO-d6 and the internal standard was TMS

| $^1$H-NMR data of the compound of Example 2 | | | |
|---|---|---|---|
| No | chemical shift (ppm) | Spectral line multiplicity | J (Hz) | Proton number |
| 1 | 8.72 | d | 1.7 | 1 |
| 2 | 8.56 | dd | 4.8, 1.7 | 1 |
| 3 | 7.92 | m | \ | 1 |
| 4 | 7.64 | dd | 7.7, 1.7 | 1 |
| 5 | 7.55 | s | \ | 1 |
| 6 | 7.51 | t | 7.6 | 1 |
| 7 | 7.49-7.46 | m | \ | 1 |
| 8 | 7.46-7.44 | m, | \ | 1 |
| 9 | 7.44-7.42 | m | \ | 1 |
| 10 | 7.42-7.40 | m | \ | 1 |
| 11 | 7.40-7.38 | m | \ | 2 |
| 12 | 7.38-7.36 | m | \ | 1 |
| 13 | 7.14 | s | \ | 1 |
| 14 | 6.05 | s | \ | 2 |
| 15 | 5.48 | brs | \ | 1 |
| 17 | 5.34 | s | \ | 2 |
| 18 | 5.29 | s | \ | 2 |
| 19 | 4.86 | p | 6.3 | 1 |
| 20 | 4.10 | s | \ | 2 |
| 21 | 3.87-3.73 | m | \ | 3 |
| 22 | 1.16 | dd | \ | 6 |

| $^{13}$C-NMR data of the compound of Example 2 | | | |
|---|---|---|---|
| No | chemical shift (ppm) | Number of carbon atoms | Carbon type | functional group |
| 1 | 167.69 | 1 | 4° | Ester group |
| 2 | 167.12 | 2 | 4° | carboxyl |
| 3 | 156.60 | 1 | 4° | Aromatic ring carbon |
| 4 | 154.76 | 1 | 4° | Aromatic ring carbon |
| 5 | 149.33 | 1 | 3° | Aromatic ring carbon |
| 6 | 148.97 | 1 | 3° | Aromatic ring carbon |
| 7 | 143.10 | 1 | 4° | Aromatic ring carbon |
| 8 | 140.76 | 1 | 4° | Aromatic ring carbon |
| 9 | 136.16 | 1 | 4° | Aromatic ring carbon |
| 10 | 135.68 | 1 | 3° | Aromatic ring carbon |
| 11 | 135.24 | 2 | 3° | Alkene bond |
| 12 | 132.51 | 1 | 3° | Aromatic ring carbon |
| 13 | 132.00 | 1 | 4° | Aromatic ring carbon |
| 14 | 131.27 | 1 | 3° | Aromatic ring carbon |
| 15 | 129.25 | 2 | 3° | Aromatic ring carbon |
| 16 | 129.10 | 1 | 3° | Aromatic ring carbon |
| 17 | 128.20 | 2 | 3° | Aromatic ring carbon |
| 18 | 127.84 | 1 | 3° | Aromatic ring carbon |
| 19 | 127.78 | 1 | 3° | Aromatic ring carbon |
| 20 | 123.63 | 1 | 3° | Aromatic ring carbon |
| 21 | 123.06 | 1 | 4° | Aromatic ring carbon |
| 22 | 112.90 | 1 | 4° | Aromatic ring carbon |
| 23 | 100.19 | 1 | 3° | Aromatic ring carbon |
| 24 | 71.08 | 1 | 2° | methylene |
| 25 | 69.66 | 1 | 3° | Methyne |
| 26 | 68.16 | 1 | 2° | methylene |
| 27 | 60.47 | 1 | 3° | Methyne |
| 28 | 59.50 | 1 | 2° | methylene |
| 29 | 43.34 | 1 | 2° | methylene |
| 30 | 21.40 | 1 | 1° | methyl |
| 31 | 21.34 | 1 | 1° | methyl |

6) Specific Rotation:
  (1) Test instrument: American PE Model 343 polarimeter.
  (2) Test method: the product of the present invention was weighed accurately, dissolved in DMSO, and diluted quantitatively to obtain a solution containing about 50 mg per 1 ml, and the specific rotation was determined.
  (3) Test temperature: 20° C.
  (4) Results With DMSO as the solvent and the determination concentration of 50 mg/ml, the specific rotation of the compound of Example 2 was +5.5°. $[\alpha]^{20}_{589}$=+5.5' (C=5, DMSO)

3. Crystal Form Analysis of the Compound of Example 2

1) Powder X-Ray Diffraction Analysis:
  (1) Test instrument: D8-Advance X-ray diffractometer
  (2) Test conditions: working voltage: 40 kV, working current: 40 mA, Cu target. Scanning speed: 0.02 degrees/step, dwell time: 0.1 seconds/step.

Figure 3:
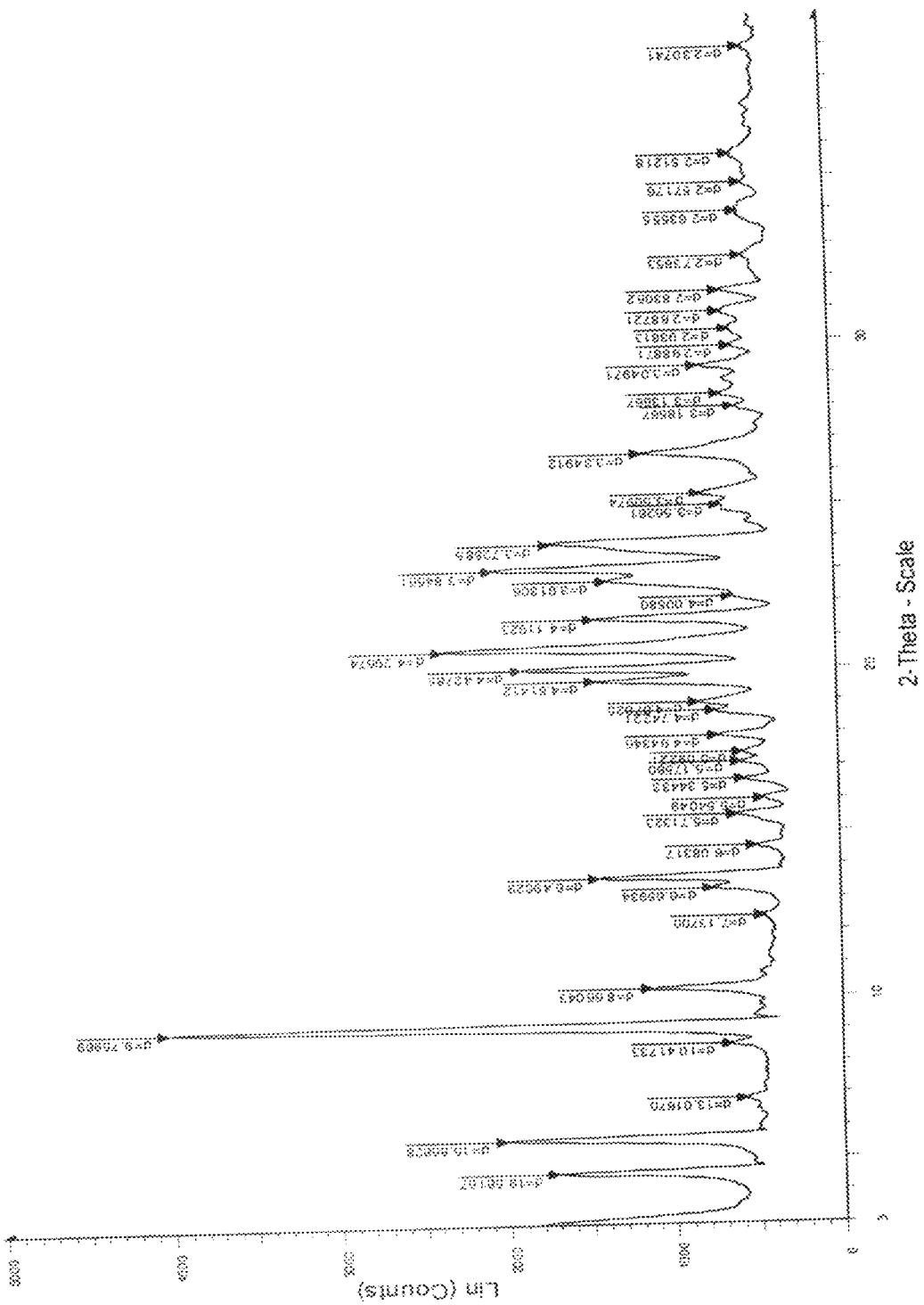
FIG. 3. Powder X-ray diffraction pattern of compound of Example 2.

(3) Test results (see FIG. 3):

Powder X-ray diffraction data table of the compound of Example 2

| Intensity % | Angle 2-theta | Intensity Cont | d value Angstrom |
|---|---|---|---|
| 42.3 | 4.509 | 1707 | 19.58167 |
| 50.1 | 5.565 | 2020 | 15.86828 |
| 14.0 | 6.785 | 567 | 13.01670 |
| 16.2 | 8.481 | 653 | 10.41733 |
| 100.0 | 9.054 | 4033 | 9.75969 |
| 28.1 | 10.206 | 1133 | 8.66043 |
| 11.1 | 12.392 | 449 | 7.13700 |
| 18.6 | 13.285 | 749 | 6.65934 |
| 35.6 | 13.620 | 1435 | 6.49629 |
| 12.1 | 14.550 | 486 | 6.08317 |
| 15.0 | 15.497 | 603 | 5.71323 |
| 11.0 | 15.984 | 442 | 5.54049 |
| 13.6 | 16.574 | 550 | 5.34433 |
| 14.2 | 17.119 | 573 | 5.17560 |
| 13.8 | 17.401 | 558 | 5.09221 |
| 17.4 | 17.929 | 703 | 4.94346 |
| 17.6 | 18.697 | 711 | 4.74221 |
| 20.1 | 18.963 | 809 | 4.67625 |
| 35.5 | 19.650 | 1432 | 4.51412 |
| 46.6 | 20.037 | 1880 | 4.42785 |
| 58.3 | 20.655 | 2351 | 4.29674 |
| 35.5 | 21.556 | 1433 | 4.11923 |
| 15.0 | 22.174 | 604 | 4.00580 |
| 33.6 | 22.706 | 1356 | 3.91306 |
| 50.5 | 23.110 | 2036 | 3.84561 |
| 42.0 | 23.863 | 1692 | 3.72585 |
| 16.4 | 24.974 | 660 | 3.56261 |
| 19.2 | 25.356 | 774 | 3.50974 |
| 28.0 | 26.594 | 1127 | 3.34912 |
| 13.9 | 27.986 | 560 | 3.18567 |
| 15.9 | 28.414 | 641 | 3.13867 |
| 19.1 | 29.261 | 772 | 3.04971 |
| 14.2 | 29.872 | 574 | 2.98871 |
| 14.4 | 30.398 | 581 | 2.93813 |
| 15.7 | 30.948 | 634 | 2.88721 |
| 15.6 | 31.580 | 631 | 2.83082 |
| 12.2 | 32.673 | 493 | 2.73853 |
| 12.7 | 33.988 | 512 | 2.63555 |
| 11.9 | 34.858 | 480 | 2.57176 |
| 13.4 | 35.712 | 539 | 2.51218 |
| 11.2 | 39.004 | 453 | 2.30741 |

(4) Analysis: powder X-ray diffraction analysis showed that the compound of Example 2 was a crystalline substance.

2) Differential Scanning Calorimetry/Thermogravimetric Analysis (DSC/TG):
  (1) Test instrument: Swiss Mettler TGA/DSC3⁺ thermal analyzer
  (2) Parameter setting: starting temperature: 35° C.; termination temperature: 250° C.; heating rate: 10° C./min.
  (3) Measured data: DSC: peak temperature: 174.68° C. (endothermic).
  TGA: weight loss started at about 170° C., and the weight loss was obvious at 175° C.
  (4) Analysis: DSC showed that there was an endothermic peak at 174.68° C., which should be caused by the heat absorbed from the melting of the compound of Example 2. TGA showed that the thermogravimetric curve was basically unchanged before 160° C., and there was no weight loss, indicating that the compound of Example 2 did not contain crystallization solvent. When the temperature rose to the top of DSC endothermic peak (about 175° C.), the weight loss was obvious, which was the weight loss caused by the melting decomposition of the sample. The DSC endothermic peak was the decomposition point of the compound of Example 2.

4. Comparison of Stability Between the Compound of Example 1 and the Compound of Example 2
1) Stability of the Compound of Example 1
(1) Physical and Chemical Properties
  Appearance: off white powder
  Melting point: 119.36° C. (DSC method) (see FIG. 1)
  Purity: 99.5% (HPLC normalization method)
  log P=2.4
(2) Influencing factor test

| | Appearance | Melting point (DSC method, ° C.) | Purity (%) | Related substances (%) |
|---|---|---|---|---|
| Initial | off white powder | 119.36 | 99.5 | 0.5 |
| 60° C., 5 days | off white powder | 118.69 | 99.5 | 0.5 |
| RH 92.5%, 5 days | colorless viscous liquid | — | 99.5 | 0.5 |
| Illumination, 5 days | transparent bulk solid | — | 96.0 | 4.0 |

The compound of Example 1 showed no obvious change in appearance, melting point and impurity content after being placed at a high temperature of 60° C., for 5 days, indicating that it was stable under high temperature conditions. After being placed at a high humidity of RH92.5% for 5 days, the compound showed serious moisture absorption, colorless viscous liquid in appearance, and no change in related substances. The compound showed transparent bulk in appearance under illumination conditions, and impurity content thereof increased to 4.0%, indicating that it was unstable under illumination conditions.

Figure 2:
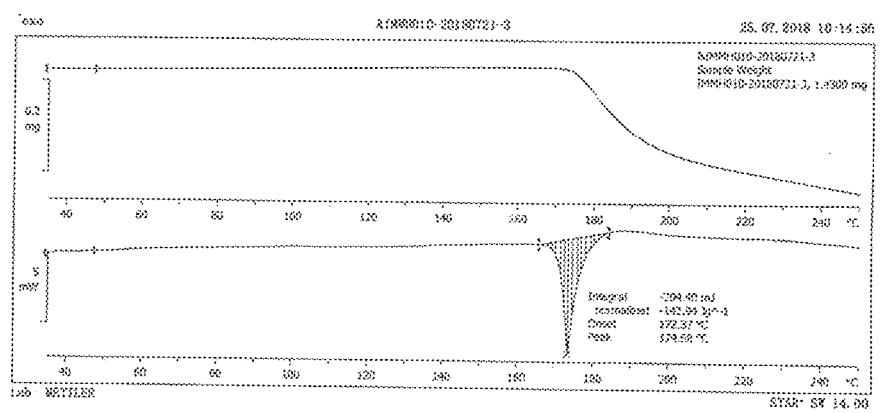
FIG. 2. Differential scanning calorimetry/thermogravimetric analysis spectrum of compound of Example 2.

2) Stability of the Compound of Example 2
  (1) Physical and chemical properties
  Appearance: white solid
  Melting point: 174.68° C. (DSC method) (see FIG. 2)
  Purity: 98.7% (HPLC normalization method)
  log P=3.2
  (2) Influencing factor test

| | Appearance | Melting point (DSC method, ° C.) | Chiral impurities (%) | Purity (%) | Related substances (%) |
|---|---|---|---|---|---|
| Initial | white powder | 174.68 | 0.2 | 98.7 | 1.3 |
| 60° C., 10 days | white powder | 174.64 | 0.2 | 98.7 | 1.3 |
| RH 92.5%, 10 days | white powder | 174.57 | 0.2 | 98.7 | 1.3 |
| Illumination, 10 days | white powder | 174.60 | 0.2 | 98.6 | 1.4 |

The compound of Example 2 was stable under the conditions of illumination, high temperature and high humidity.
5. Comparison of Antitumor Effects of the Compound of Example 1 and the Compound of Example 2 on Mouse Melanoma B16F10 In Vivo
Purpose of the Experiment:
  The in vivo antitumor effects of the compound of Example 1 and the compound of Example 2 as PD-L1 inhibitors on mouse melanoma B16F10 were evaluated on the subcutaneous transplanted tumor model of mice.
Experimental Solution:
  Animal grouping: the experiment animals were divided into solvent control group, cyclophosphamide 80 mg/kg group (CTX), 5 mg/kg group and 10 mg/kg group of the compound of Example 1 and the compound of Example 2 respectively.

Experimental steps: the subcultured B16F10 tumor strain was ground with a homogenizer, washed twice with sterile normal saline and counted, and the cell concentration of tumor cell suspension was adjusted with normal saline to $9\times10^6$/ml. 0.2 ml of the cell suspension was inoculated into the right armpit of C57BL/6J mice and the day was recorded as day 0. The next day after inoculation, the animals were randomly divided into groups, weighed and administered. The mice in the solvent control group were administrated with 0.5% CMC orally every day. The cyclophosphamide was administrated by intraperitoneal administration. The compounds to be tested were administered orally once a day. The animals were weighed and killed during treatment. The tumor tissues were stripped, weighed and photographed. Finally, the tumor inhibition rates were calculated to evaluate the intensity of antitumor effect.

Calculation and statistical method: tumor proliferation inhibition rate TGI (%): TGI=(1-T/C)×100. (T: tumor weight in the treatment group; C: tumor weight in the negative control group). Statistical method: Graphpad was used for data statistical analysis, and One-way ANOVA test was used, * $P<0.05$, * * $P<0.01$, * * * $P<0.001$.

Experimental Results:

After administration, the animals were executed and the tumors were weighed. The antitumor effects of the compound of Example 1 and the compound of Example 2 on mouse melanoma B16F10 were shown in the table below.

In Vivo Antitumor Effect of the Compound of Example 2 on Mouse B16F10

6. Comparison of Antitumor Effects of the Compound of Example 1 and the Compound of Example 2 on Mouse Colon Cancer MC38 In Vivo Purpose of the experiment:

The in vivo antitumor effects of the compound of Example 1 and the compound of Example 2 as PD-L1 inhibitors on mouse colon cancer MC38 were evaluated on the subcutaneous transplanted tumor model of mice.

Experimental Solution:

Animal grouping: the experiment animals were divided into solvent control group, cyclophosphamide 80 mg/kg group (CTX), 5 mg/kg group and 10 mg/kg group of the compound of Example 1 and the compound of Example 2 respectively.

Experimental steps: the subcultured MC38 tumor strain was ground with a homogenizer, washed twice with sterile normal saline and counted, and the cell concentration of tumor cell suspension was adjusted with normal saline to $9\times10^6$/ml, 0.2 ml of the cell suspension was inoculated into the right armpit of C57BL/6J mice and the day was recorded as day 0. The next day after inoculation, the animals were randomly divided into groups, weighed and administered. The mice in the solvent control group were administrated with 0.5% CMC orally every day. The cyclophosphamide was administrated by intraperitoneal administration. The compounds to be tested were administered orally once a day. The animals were weighed and killed during treatment. The tumor tissues were stripped, weighed and photographed. Finally, the tumor inhibition rates were calculated to evaluate the intensity of antitumor effect.

Calculation and statistical method: tumor proliferation inhibition rate TGI (%): TGI=(1-T/C)×100. (T: tumor weight in the treatment group: C: tumor weight in the negative control group). Statistical method: Graphpad was used for data statistical analysis, and One-way ANOVA test was used, * $P<0.05$, * * $P<0.01$, * * * $P<0.001$.

Experimental Results:

After administration, the animals were executed and the tumors were weighed. The antitumor effects of the compound of Example 1 and the compound of Example 2 on mouse colon cancer MC38 were shown in the table below.

| Grouping | Dosage (mg/kg) | Number (Start/End) | Body weight (g) X ± SD Start | Body weight (g) X ± SD End | Tumor weight (g) X ± SD | Tumor weight (g) TGI % |
|---|---|---|---|---|---|---|
| Solvent control group | | 10/10 | 17.32 ± 0.46 | 21.0 ± 0.7 | 2.32 ± 0.85 | NA |
| CTX group | 80 × 1 | 10/10 | 16.94 ± 0.43 | 19.2 ± 0.8 | 0.23 ± 0.18*** | 90 |
| Example 2 compound group | 5 × 14 | 10/10 | 17.09 ± 0.81 | 20.0 ± 1.2 | 1.39 ± 0.84* | 40 |
| | 10 × 14 | 10/10 | 17.15 ± 0.50 | 20.1 ± 1.0 | 1.04 ± 0.66** | 55 |

Note:
compared with the solvent control group, *P < 0.05, P < 0.01, *P < 0.001, One way ANOVA
NA: not applicable In Vivo Antitumor Effect of the Compound of Example 1 on Mouse B16F10

| Grouping | Dosage (mg/kg) | Number (Start/End) | Body weight (g) X ± SD Start | Body weight (g) X ± SD End | Tumor weight (g) X ± SD | Tumor weight (g) TGI % |
|---|---|---|---|---|---|---|
| Solvent control group | | 7/7 | 17.1 ± 0.9 | 18.8 ± 1.1 | 3.49 ± 0.91 | NA |
| CTX group | 80 × 1 | 7/7 | 16.9 ± 0.8 | 17.5 ± 0.9 | 1.00 ± 0.34*** | 70 |
| Example 1 compound group | 5 × 14 | 7/7 | 17.7 ± 1.1 | 20.1 ± 1.5 | 3.11 ± 0.98* | 11 |
| | 10 × 14 | 7/7 | 18.8 ± 1.4 | 21.0 ± 1.8 | 3.04 ± 0.94** | 13 |

Note:
compared with the solvent control group, *P < 0.05, P < 0.01, *P < 0.001, One way ANOVA
NA: not applicable Antitumor Effect of the Compound of Example 2 on Mouse Colon Cancer MC38

| Grouping | Dosage (mg/kg) | Number (Start/End) | Body weight (g) X ± SD Start | Body weight (g) X ± SD End | Tumor weight (g) X ± SD | Tumor weight (g) TGI % |
|---|---|---|---|---|---|---|
| Solvent control group | | 10/10 | 22.0 ± 0.4 | 26.1 ± 1.3 | 1.70 ± 0.75 | NA |
| CTX group | 40 × 2 | 10/10 | 22.0 ± 0.8 | 24.5 ± 0.9 | 0.17 ± 0.10** | 90 |
| Example 2 compound group | 2.5 × 14 | 10/10 | 22.0 ± 0.6 | 25.3 ± 2.3 | 1.13 ± 0.78 | 34 |
| | 5 × 14 | 10/10 | 21.9 ± 0.8 | 23.7 ± 1.8 | 0.42 ± 0.39*** | 75 |
| | 10 × 14 | 10/10 | 21.9 ± 0.7 | 25.0 ± 1.7 | 0.73 ± 0.54** | 57 |

Note:
compared with the solvent control group, *p < 0.05, p < 0.01, *p < 0.001, One-way ANOVA
NA: not applicable Antitumor Effect of Compound of Example 1 on Mouse Colon Cancer MC38

| Grouping | Dosage (mg/kg) | Number (Start/End) | Body weight (g) X ± SD Start | Body weight (g) X ± SD End | Tumor weight (g) X ± SD | Tumor weight (g) TGI % |
|---|---|---|---|---|---|---|
| Solvent control group | | 7/7 | 18.6 ± 0.3 | 24.1 ± 0.8 | 3.94 ± 0.78 | NA |
| CTX group | 40 × 1 | 6/6 | 18.8 ± 0.9 | 21.7 ± 1.4 | 1.30 ± 1.44** | 67 |
| Example 1 compound group | 5 × 14 | 5/6 | 18.7 ± 0.4 | 23.4 ± 1.2 | 3.21 ± 0.28*** | 18 |
| | 10 × 14 | 5/6 | 18.5 ± 0.6 | 23.8 ± 1.4 | 2.86 ± 1.36** | 27 |

Note:
compared with the solvent control group, *p<0.05. p<0.01. *p<0.001, One-way ANOVA
NA: not applicable 7. Comparison of Antitumor Effects of the Compound of Example 1 and the Compound of Example 2 on Human Lung Cancer NCI-H460 Model Purpose of the Experiment:

The in vivo antitumor effects of the compound of Example 1 and the compound of Example 2 as PD-L1 inhibitors were evaluated on the NCI-H460 model of human lung cancer in NSG tumor-bearing mice reconstructed by human immune system.

Experimental Solution:

Animal grouping: the experiment animals were divided into solvent control group, cyclophosphamide 80 mg/kg group (CTX). 5 mg/kg group and 10 mg/kg group of the compound of Example 1 and the compound of Example 2 respectively.

Experimental steps: PBMCs were obtained by isolation of fresh human leukocytes, then inoculated into NSG mice through caudal vein, and each mouse was inoculated with 1×10⁷. On the third day. NCI-H460 tumor cells were inoculated into the armpit of mice, and each mouse was inoculated with 1×10⁶. After the tumors grew to 100~300 mm³, the mice were administered in groups. The mice in the solvent control group were administrated with 0.5% CMC orally every day. The cyclophosphamide was administrated by intraperitoneal administration. The compounds to be tested were administered orally once a day. The animals were weighed and killed during treatment. The tumor tissues were stripped, weighed and photographed. Finally, the tumor inhibition rates were calculated to evaluate the intensity of antitumor effect.

Calculation and statistical method: tumor proliferation inhibition rate TGI (%): TGI=(1-T/C)×100. (T: tumor weight in the treatment group: C: tumor weight in the negative control group). Statistical method: Graphpad was used for data statistical analysis, and One-way ANOVA test was used, * P<0.05, * * P<0.01, * * * P<0.001.

Experimental Results:

After administration, the animals were executed and the tumors were weighed. The antitumor effects of the compound of Example 1 and the compound of Example 2 on NCI-H460 were shown in the table below.

Antitumor Effect of the Compound of Example 1 and the Compound of Example 2 on NCI-H460

| Grouping | Dosage (mg/kg) | Number (Start/End) | Tumor volume X ± SD Day 1 | Tumor volume X ± SD Day 20 | Tumor weight (g) X ± SD | Tumor weight (g) TGI % |
|---|---|---|---|---|---|---|
| Solvent control group | | 5/5 | 180.4 ± 13.0 | 2129.9 ± 362.7 | 2.73 ± 0.60 | NA |
| CTX group | 100 × 1 | 5/5 | 165.4 ± 22.4 | 556.5 ± 81.1 | 0.90 ± 0.15*** | 66.9 |
| Example 2 compound group | 15 × 14 | 5/5 | 166.5 ± 24.5 | 1405.2 ± 442.9 | 1.90 ± 0.0.37 | 30.6 |

-continued

| Grouping | Dosage (mg/kg) | Number (Start/End) | Tumor volume X ± SD | | Tumor weight (g) | |
|---|---|---|---|---|---|---|
| | | | Day 1 | Day 20 | X ± SD | TGI % |
| Example 1 compound group | 15 × 14 | 5/5 | 161.9 ± 21.0 | 1441.4 ± 337.6 | 2.06 ± 0.22 | 24.7 |

Note:
compared with the solvent control group, *p < 0.05, p < 0.01, *p < 0.001, One-way ANOVA
NA: not applicable To sum up, the experimental results showed that:

In the subcutaneous transplanted tumor model of mouse melanoma highly metastatic strain B16F10, the tumor inhibition rates of the compound of Example 2 at the daily oral dosages of 5 mg/kg and 10 mg/kg were 40% and 55% respectively, while the tumor inhibition rates of the compound of Example 1 at the same dosages were 11% and 13% respectively.

In the subcutaneous transplanted tumor model of mouse colon cancer MC38, the tumor inhibition rates of the compound of Example 2 at the daily oral dosages of 5 mg/kg and 10 mg/kg were 75% and 57% respectively, while the tumor inhibition rates of the compound of Example 1 at the same dosages were 18% and 27% respectively.

On NSG tumor-bearing mice (NCI-H460) with reconstructed human immune system, the tumor inhibition rate of the compound of Example 2 at the daily oral dosage of 15 mg/kg was better than that of the compound of Example 1 (tumor inhibition rate: 30.6% vs 24.7%).

| Tumor model | Comparison of tumor inhibition rate at the same dosage |
|---|---|
| B16F10 | Compound of the Example 2 (maleate) > Compound of the Example 1 (hydrochloride) |
| MC38 | Compound of the Example 2 (maleate) > Compound of the Example 1 (hydrochloride) |
| NSG NCI-H460 | Compound of the Example 2 (maleate) > Compound of the Example 1 (hydrochloride) |

What is claimed is:

1. A crystal form A solid substance of isopropyl (S)-N-(2-(pyridine-3-yl-methoxy)-4-(2-bromo-3-phenylbenzyloxy)-5-chlorobenzyl) serinate maleate, characterized in that, when powder X-ray diffraction analysis is used and Cu Target Radiation experimental conditions are adopted, the position of diffraction peak: 2-theta value (°) or d value (Å) and relative intensity (%) of diffraction peak have the following characteristics:

| Peak | 2-Theta ±0.2° | d(Å) ±0.2 Å | intensity % ±5% |
|---|---|---|---|
| 1 | 4.5 | 19.6 | 42.3 |
| 2 | 5.6 | 15.9 | 50.1 |
| 3 | 6.8 | 13.0 | 14.0 |
| 4 | 8.5 | 10.4 | 16.2 |
| 5 | 9.1 | 9.8 | 100 |
| 6 | 10.2 | 8.7 | 28.1 |
| 7 | 12.4 | 7.1 | 11.1 |
| 8 | 13.3 | 6.7 | 18.6 |
| 9 | 13.6 | 6.5 | 35.6 |
| 10 | 14.6 | 6.1 | 12.1 |
| 11 | 15.5 | 5.7 | 15 |
| 12 | 16.0 | 5.5 | 11 |
| 13 | 16.6 | 5.3 | 13.6 |
| 14 | 17.1 | 5.2 | 14.2 |
| 15 | 17.4 | 5.1 | 13.8 |
| 16 | 17.9 | 4.9 | 17.4 |
| 17 | 18.7 | 4.7 | 17.6 |
| 18 | 19.0 | 4.7 | 20.1 |
| 19 | 19.7 | 4.5 | 35.5 |
| 20 | 20.0 | 4.4 | 46.6 |
| 21 | 20.7 | 4.3 | 58.3 |
| 22 | 21.6 | 4.1 | 35.5 |
| 23 | 22.2 | 4.0 | 15 |
| 24 | 22.7 | 3.9 | 33.6 |
| 25 | 23.1 | 3.9 | 50.5 |
| 26 | 23.9 | 3.7 | 42 |
| 27 | 25.0 | 3.6 | 16.4 |
| 28 | 25.4 | 3.5 | 19.2 |
| 29 | 26.6 | 3.4 | 28 |
| 30 | 28.0 | 3.2 | 13.9 |
| 31 | 28.4 | 3.1 | 15.9 |
| 32 | 29.3 | 3.1 | 19.1 |
| 33 | 29.9 | 3.0 | 14.2 |
| 34 | 30.4 | 2.9 | 14.4 |
| 35 | 31.0 | 2.9 | 15.7 |
| 36 | 31.6 | 2.8 | 15.6 |
| 37 | 32.7 | 2.7 | 12.2 |
| 38 | 34.0 | 2.6 | 12.7 |
| 39 | 34.9 | 2.6 | 11.9 |
| 40 | 35.7 | 2.5 | 13.4 |
| 41 | 39.0 | 2.3 | 11.2 |

2. The crystal form A solid substance of isopropyl (S)-N-(2-(pyridine-3-yl-methoxy)-4-(2-bromo-3-phenylbenzyloxy)-5-chlorobenzyl) serinate maleate according to claim 1, characterized in that, when analyzed by infrared spectrum, the absorption peaks at 3059, 2984, 2841, 2761, 2519, 2170, 1988, 1968, 1807, 1741, 1716, 1623, 1602, 1580, 1505, 1481, 1460, 1446, 1425, 1401, 1389, 1368, 1309, 1262, 1242, 1205, 1171, 1111, 1095, 1069, 1040, 1004, 972, 953, 924, 884, 870, 864, 854, 824, 788, 761, 721, 703, and 662 $cm^{-1} \pm 2\ cm^{-1}$ are the characteristic peak positions of infrared spectrum presented by the crystal form A solid substance.

3. The crystal form A solid substance of isopropyl (S)-N-(2-(pyridine-3-yl-methoxy)-4-(2-bromo-3-phenylbenzyloxy)-5-chlorobenzyl) serinate maleate according to claim 1, characterized in that, when analyzed by differential scanning calorimetry, there is an endothermic peak at 175° C.±3° C., in the DSC spectrum with a heating rate of 10° C., per minute.

4. A mixed crystal solid substance of isopropyl (S)-N-(2-(pyridine-3-yl-methoxy)-4-(2-bromo-3-phenylbenzyloxy)-5-chlorobenzyl) serinate maleate, characterized in that, it comprises any non-zero proportion of the crystal form A solid substance of isopropyl (S)-N-(2-(pyridine-3-yl-methoxy)-4-(2-bromo-3-phenylbenzyloxy)-5-chlorobenzyl) serinate maleate according to claim 1.

5. A preparation method of the crystal form A solid substance according to claim 1, wherein the preparation method is as follows:
   reacting isopropyl (S)-N-(2-(pyridine-3-yl-methoxy)-4-(2-bromo-3-phenylbenzyloxy)-5-chlorobenzyl) serinate with maleic acid in a solvent to form a salt;
   crystallizing the obtained isopropyl (S)-N-(2-(pyridine-3-yl-methoxy)-4-(2-bromo-3-phenylbenzyloxy)-5-chlorobenzyl) serinate maleate in a mixed solvent of acetone and water, the ratio of acetone to water ranges from 200:1 to 1:1.

6. A pharmaceutical composition, wherein the pharmaceutical composition comprises the crystal form A solid substance according to claim 1 as an active ingredient, and a pharmaceutically acceptable carrier or excipient thereof.

7. A pharmaceutical composition, wherein the pharmaceutical composition comprises the crystal form A solid substance according to claim 2 as an active ingredient, and a pharmaceutically acceptable carrier or excipient thereof.

8. A pharmaceutical composition, wherein the pharmaceutical composition comprises the crystal form A solid substance according to claim 3 as an active ingredient, and a pharmaceutically acceptable carrier or excipient thereof.

9. A pharmaceutical composition, wherein the pharmaceutical composition comprises the mixed crystal solid substance according to claim 4 as an active ingredient, and a pharmaceutically acceptable carrier or excipient thereof.

10. A method for treating diseases related to PD-1/PD-L1 signal pathway, which comprises administering the crystal form A solid substance according to claim 1 to a subject in need thereof.

11. The method according to claim 10, wherein the diseases related to PD-1/PD-L1 signal pathway are selected from cancer, infectious diseases and autoimmune diseases.

12. The method according to claim 11, wherein the cancer is selected from skin cancer, lung cancer, urological tumor, blood tumor, breast cancer, glioma, digestive system tumor, reproductive system tumor, lymphoma, nervous system tumor, brain tumor, head and neck cancer; the infectious diseases are selected from bacterial infection and viral infection; the autoimmune diseases are selected from organ specific autoimmune diseases and systemic autoimmune diseases, wherein, the organ specific autoimmune diseases are selected from chronic lymphocytic thyroiditis, hyperthyroidism, insulin dependent diabetes mellitus, myasthenia gravis, ulcerative colitis, pernicious anemia with chronic atrophic gastritis, pulmonary hemorrhage nephritis syndrome, primary biliary cirrhosis, multiple sclerosis, and acute idiopathic polyneuritis, the systemic autoimmune diseases are selected from rheumatoid arthritis, systemic lupus erythematosus, systemic vasculitis, scleroderma, pemphigus, dermatomyositis, mixed connective tissue disease and autoimmune hemolytic anemia.

* * * * *